US006709593B2

(12) United States Patent
Lorenz (10) Patent No.: US 6,709,593 B2
(45) Date of Patent: Mar. 23, 2004

(54) METHOD FOR PURIFYING WASTE WATER, AND PURIFICATION PLANT FOR CARRYING OUT SAID METHOD

(76) Inventor: Günter Lorenz, Am Rehlingsbach 25, Friedrichsdorf (DE), D-61381

( * ) Notice: Subject to any disclaimer, the term of this patent is extended or adjusted under 35 U.S.C. 154(b) by 9 days.

(21) Appl. No.: 10/339,254

(22) Filed: Jan. 7, 2003

(65) Prior Publication Data

US 2003/0111411 A1 Jun. 19, 2003

Related U.S. Application Data

(63) Continuation of application No. PCT/EP01/09387, filed on Aug. 14, 2001.

(30) Foreign Application Priority Data

Aug. 16, 2000 (DE) .......................... 100 39 932
May 8, 2001 (DE) .......................... 101 22 190

(51) Int. Cl.[7] ................................................ C02F 3/30
(52) U.S. Cl. .................. 210/603; 210/609; 210/630; 210/195.3; 210/198.1; 210/903
(58) Field of Search ........................ 210/603, 605, 210/609, 612, 623, 624, 630, 631, 181, 195.3, 199, 205, 206, 259, 198.1, 903, 906

(56) References Cited

U.S. PATENT DOCUMENTS

| 2,349,390 A | * | 5/1944 | Tolman ............... 210/609 |
| 2,359,004 A | * | 9/1944 | Schlenz et al. ....... 210/605 |
| 2,850,449 A | * | 9/1958 | Torpey ................ 210/609 |
| 3,220,945 A | * | 11/1965 | Torpey ................ 210/609 |
| 3,248,323 A | * | 4/1966 | Albertson ............ 210/609 |
| 3,787,316 A | * | 1/1974 | Brink et al. ........ 210/608 |
| 4,246,099 A | * | 1/1981 | Gould et al. ........ 210/603 |
| 5,252,214 A | * | 10/1993 | Lorenz et al. ....... 210/605 |
| 6,113,789 A | * | 9/2000 | Burke ................ 210/609 |

FOREIGN PATENT DOCUMENTS

| DE | 35 34 603 A | 4/1987 |
| EP | 0 019 733 A | 12/1980 |
| JP | 5-337496 | 12/1993 |
| WO | WO 88 06570 A | 9/1988 |
| WO | WO 99 61378 A | 12/2002 |

* cited by examiner

Primary Examiner—Fred G. Prince
(74) Attorney, Agent, or Firm—Alix, Yale & Ristas, LLP (57) ABSTRACT

The invention relates to problematic waste water with highly concentrated impurities, for example seepage water from a refuse dump, which is anaerobically degraded in an anaerobic treatment zone (digester) and the digested sludge arising therefrom is mechanically de-watered. Simultaneously, communal waste water is purified in a purification plant containing an aerobic treatment zone, wherein advanced nitrification/denitrification and/or phosphorous elimination can be activated/started by recycling oxygen and nitrate rich water and sludge back into the inlet area. In the aerobic purification zone, the excess digested sludge, in which a large part of the AOX load of the communal waste is incorporated, is mechanically de-watered and is discharged into the anaerobic purification zone (digester), in order to degrade the AOX load by decomposition. The degree of dewatering of the excess sludge is controlled according to the amount of problematic waste water to be processed. The filtrate obtained from the dewatered sludge, which contains the greater part of the nitrogen load, is introduced into the aerobic purification zone in the purification plant and is subjected to nitrification/denitrification therein.

14 Claims, 4 Drawing Sheets

METHOD FOR PURIFYING WASTE WATER, AND PURIFICATION PLANT FOR CARRYING OUT SAID METHOD

CROSS REFERENCE TO RELATED APPLICATION

This application is a continuation of International PCT Application No. PCT/EP01/09387 filed Aug. 14, 2001.

FIELD OF THE INVENTION

BACKGROUND OF THE INVENTION

The invention relates to a method for purifying waste water by means of anaerobic treatment (digestion) in an anaerobic treatment zone. The method is preferably applied to the treatment of highly concentrated problematic waste water, e.g., seepage water from a refuse dump, that contains organic impurities (COD, chemical oxygen demand) dissolved in high concentrations, as well as AOX (absorbable organic halogen compounds), and is therefore not suitable for discharge into a conventional communal purification plant with aerobic treatment zones. Problematic waste water of this kind can be subjected to an effective and economical elimination of COD and AOX in an anaerobic treatment zone (digestion reactor or digestion tower).

The invention also relates to a purification plant for carrying out said method.

Preferably, the invention can be applied for the simultaneously, separate treatment of communal waste water and highly concentrated problematic waste water, particularly refuse dump seepage water. Conventional, communal waste water from households, commerce or industry is purified in communal purification plants in which the degradation of the dissolved pollutants takes place in an aerobic biological treatment zone. In particular, it can consist of an activated sludge tank and/or aerobic biological reactors that are operated with high or low sludge loading. In modern plants, elimination of nitrogen by means of nitrification and denitrification takes place in addition to the degradation of the organic carbon compounds.

Known from EP 0 354 906 and WO 99/23038 are methods for aerobic waste water purification, in which returned sludge and returned water, which come from a secondary sedimentation tank that is downstream from the activated sludge tank and both of which are oxygen-rich and contain nitrate, are sent to a region, e.g., a primary sedimentation tank or its admission section, which is upstream of the activated sludge tank and has waste water flowing through it, in order to initiate nitrification/denitrification and/or a biological phosphorus elimination there.

On the other hand, there is also problematic waste water with a concentration of dissolved impurities that is so high that they cannot be effectively treated in the communal purification plants discussed above. An example of this kind of problematic waste water is seepage water from a refuse dump. It is known that highly concentrated problematic waste water can be subjected to anaerobic treatment in a digestion reactor. By doing this, organic impurities (COD), even those present in high concentrations, can be anaerobically biologically degraded, resulting in the creation of usable methane gas. AOX that is present in high concentrations is also eliminated in an economical way. However, no nitrogen elimination takes place in the anaerobic biological treatment, so digested sludge that is drawn from the digester, or more specifically, the filtrate that occurs when it is dewatered, is heavily loaded with ammonia and inorganic nitrogen compounds.

The invention is based on the task of suggesting a method for the anaerobic treatment of highly concentrated problematic waste water and preferably for the simultaneous aerobic treatment of communal waste water, by means of which an especially effective and extensive degradation of all contamination components present in the waste water, AOX, COD and nitrogen in particular, can be achieved, and by means of which the construction investment cost, energy consumption, and need for chemicals can be substantially reduced when compared with previously known methods.

The problematic waste water to be treated with the method according to the invention can occur in widely varying amounts. This can lead to fluctuations in the composition and solids content of the anaerobic treatment zone (digestion zone) contents. This can have a detrimental effect on the digestion and degradation process in the anaerobic treatment zone, particularly if the content of this zone is too greatly diluted.

The invention is also based on the task of configuring a method of the indicated type in such a way that conditions are assured in the anaerobic treatment zone that are as consistent as possible, independently of the fluctuations in admission.

SUMMARY OF THE INVENTION

Briefly stated, the invention in one preferred form is a method for treating waste water which comprises subjecting the waste water in an anaerobic treatment zone to an anaerobic degradation of the dissolved contents to form digested sludge and digested gas. Additional sludge is formed in an aerobic treatment zone of a waste purification plant. The additional sludge is sent to the anaerobic treatment zone. The additional sludge is also mechanically dewatered before sending it into the anaerobic treatment zone. The degree of dewatering is controlled in such a way that the concentration of dry substance in the anaerobic treatment zone does not fall below a pre-determined minimum value for long periods of time. The degree of dewatering is a function of the amount of waste water sent to the anaerobic treatment zone. The digested sludge is dewatered to produce a filtrate, and the filtrate is sent to an aerobic treatment zone of the waste purification plant for nitrogen degradation.

In accordance with another embodiment of the invention, a wastewater purification plant for treating waste water comprises a first admission inlet and a second admission inlet. Waste water of various origins enter the inlets. At least one aerobic treatment zone communicates with the first admission inlet for receiving waste water therefrom to form sludge. At least one anaerobic treatment zone communicates with the second admission inlet to receive waste water therefrom. Apparatus is provided for removing sludge from the at least one aerobic treatment zone. A mechanical dewatering device dewaters the sludge. Apparatus is provided for sending the dewatered sludge into the anaerobic treatment zone. A controller controls the degree of dewatering of the mechanical dewatering device. The at least one aerobic treatment zone includes a high-capacity zone and a low-capacity zone, wherein the low-capacity zone is operated with less sludge loading than the high-capacity zone. Apparatus may also be provided for withdrawing digested sludge from the anaerobic treatment zone. A device for the mechanical dewatering of the digested sludge forms a filtrate. Apparatus is also provided for sending the filtrate to at least one aerobic zone that is charged with the waste water from the first admission inlet. A precipitation zone for the chemical precipitation of waste water contents may also be disposed between the second admission inlet and the anaerobic treatment zone.

The invention is based on the principle of directing excess aerobic sludge from an aerobic treatment zone to the anaerobic treatment zone (digestion reactor) provided for the treatment of the problematic waste water, and thereby to adjust or regulate the degree of thickening (i.e., the solids content) in such a way that a solids concentration that is optimal for the anaerobic biocoenosis is maintained in the anaerobic treatment zone. In particular, undesirable dilution must be avoided in the anaerobic zone (digestion reactor).

In an advantageous development of the invention, two treatment sections that run parallel to each other, one for the aerobic treatment of communal waste water and the other for the anaerobic treatment of problematic waste water, are linked to each other in such a way that the anaerobic treatment section accepts excess sludge from the aerobic treatment section, and the filtrate that occurs in the aerobic treatment section from the dewatering of the sludge is directed into the aerobic treatment section. The advantageous effects achieved with these measures are explained in more detail in the following description of embodiments of the invention.

DETAILED DESCRIPTION OF THE PREFERRED EMBODIMENTS

When matching reference symbols are used in the drawings, the same parts of the plant are identified by them.

Figure 1:
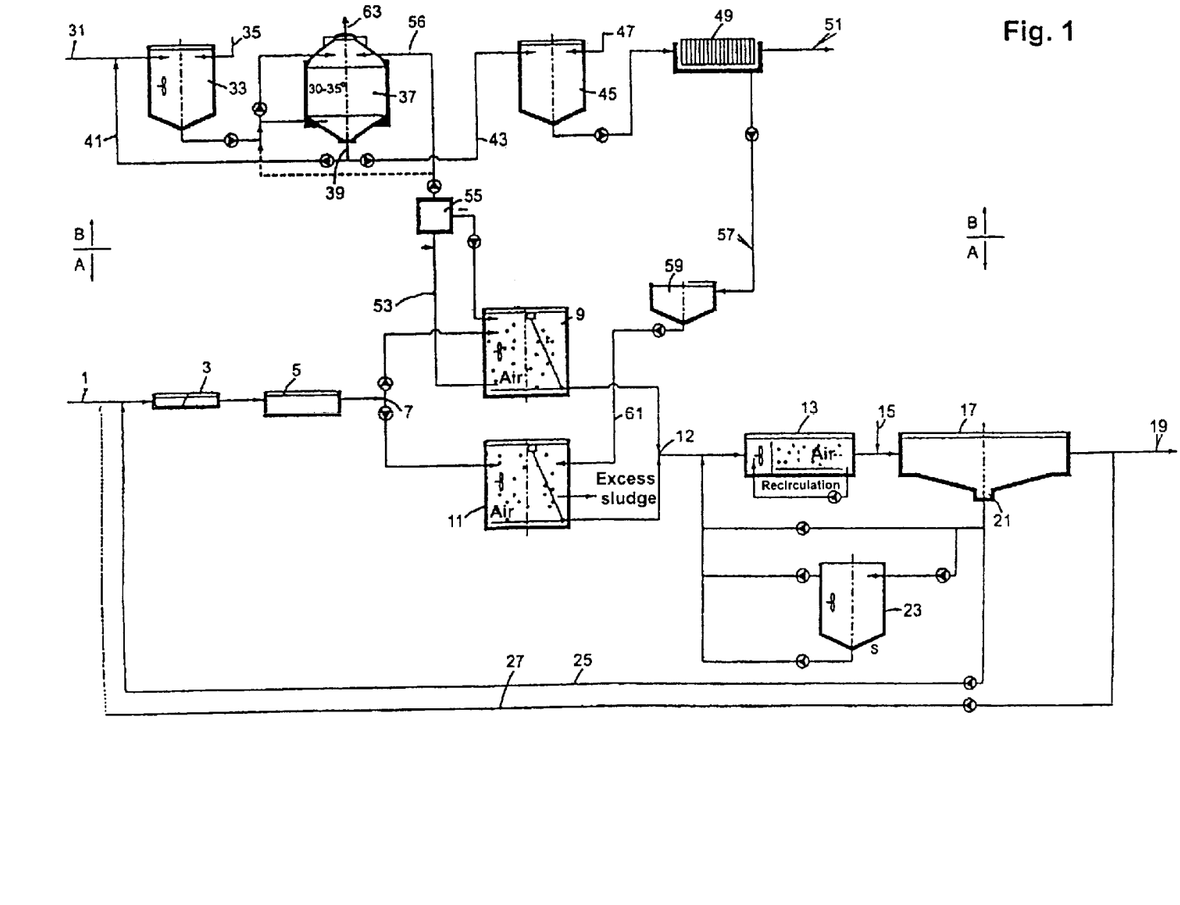
FIG. 1 Shows the diagrammatic view of a waste water treatment plant according to a first form of implementation, and operated in accordance with the method according to the invention.

The overall plant shown in FIG. 1 is comprised of two treatment sections with separate admission inlets, namely, an aerobic treatment section A (lower half) and an anaerobic section B (top half of the drawing).

In the aerobic treatment section A, communal waste water from households, commerce and/or industry flows to an admission inlet 1. It goes over a rake 3 to remove large foreign objects and a sand catcher 5 to a branching point 7, from which one part of the waste water flow (e.g., 45 to 60%) is directed to a biological aerobic high-capacity reactor 9, and the remaining portion (e.g., 40 to 55%) is directed to a biological aerobic low-capacity reactor 11. The high-capacity reactor 9 is preferably operated with a sludge loading $B_{TS}>0.6$ (kilograms $BSB_5$ per kilogram of sludge dry weight). The low-capacity reactor 11 is preferably operated with a sludge loading $B_{TS}<0.2$. Aeration, e.g., by blowing in air, and circulation are carried out to the extent necessary in both reactors 9, 11.

The reactors 9 and 11 can preferably be so-called SBR reactors (sequencing batch reactors) that are operated discontinuously in banked-up operation. After the reactor has been filled with a specific amount of admission water, the latter is mixed with the sludge that is present, then aerated, and then the activated sludge that has been made is allowed to settle, and the treated water and excess sludge are drawn off separately. After that, possibly with a stationary phase inserted in between, refilling with admission water begins.

Water-sludge mix that is drawn from the two reactors 9 and 11 is combined at 12 and is sent to a downstream activation stage 13, which is operated in the conventional way with low sludge loading ($B_{TS}$=0.05 to 0.1–0.2) and the necessary holding time. Excess sludge drawn from the low-capacity reactor 11 at 10 can be directed to the admission inlet for the second activation stage 13 in order to be available there for the nitrification or denitrification.

Sludge-water mix drawn from the activated sludge tank 13, which can have precipitation chemicals added to it at 15, goes into a secondary sedimentation tank 17 where the sludge is separated by means of sedimentation from the clarified water that is drawn off at 19. The major portion of the sludge that is drawn from the sludge sump of the secondary sedimentation tank 17 is sent in the form of returned sludge back to the admission inlet of the activated sludge tank 13, and specifically, either directly or alternatively via a sludge storage basin 23. An additional portion of the sludge drawn off at 21, as well as a portion of the pure water drawn off at 19, is sent back to the waste water admission inlet 1 via return lines 25, 27. These return flows of sludge and water are rich in oxygen and nitrifying bacteria, and are used to initiate a denitrification/nitrification and/or a biological degradation of phosphorous already in the admission inlet to the aerobic biological reactors 9, 11.

Problematic waste water with high concentrations of dissolved impurities flows into the anaerobic treatment section B at admission inlet 31. In particular, this can involve seepage water from a refuse dump, however, highly concentrated waste water from industry and commerce that is delivered separately can be mixed into it. The waste water admitted at 31 goes into a primary storage basin 33, where it can be mixed with chemicals supplied at 35, e.g., polymer precipitating agents and/or neutralizing agents. From the primary storage basin 33, the waste water goes into an anaerobic zone in the form of a digestion reactor 37 where the degradation of the impurities, which are contained in high concentrations, is carried out by means of anaerobic digestion, typically at a temperature of 30–35% [sic; ° C.]. The digested sludge that precipitates in the digestion tower 37 is drawn off at 39, and part of it can be returned via line 41 to the primary storage basin 33, or more specifically, to its inlet, and mixed with the waste water being admitted. The major portion of the digested sludge that is drawn off at 39 goes via line 43 into a secondary thickener 45, where polymer chemicals for promoting the dewatering can be supplied via line 47. The sludge is dewatered in a mechanical dewatering device 49, e.g., a filter press or decanter centrifuge, and the dewatered sludge is sent for final disposal.

According to the invention, the aerobic and anaerobic treatment sections A and B are linked in the following way:

Excess sludge that occurs in substantial amounts in the high-capacity reactor 9 is drawn off via line 53 and fed via an intermediate thickening stage 55, e.g., a wire press, revolving screen or decanter, via line 56 into the digestion tower 37. On the other hand, the filtrate that occurs during the mechanical dewatering 49 of the digested sludge is sent via line 57 to an intermediate storage basin 59, from which it is discharged via line 61 into aerobic treatment section A for the purpose of degrading the nitrogen compounds it contains. It is preferable that this takes place at times when little waste water is being admitted, especially at night. With the described embodiment having high-capacity reactor 9 and low-capacity reactor 11, the highly concentrated filtrate containing ammonia is sent via line 61 into the aerobic low-capacity reactor 11, since effective nitrification would not be possible in high-capacity reactor 9 because of a lack of nitrifying bacteria.

The following numerical values, which should not be taken as limiting, can be cited with regard to the dimensioning of the plant for a typical application with an inhabitant equivalence ("EW" in German) of approximately 100,000 residents, and for typical values regarding the type of pollutants contained in the admission flows, where $Q_M$ indicates the average amount per day:

For the communal waste water admitted at 1:
$Q_M$=18,300 m$^3$/day
AOX=0.3–4.3 mg/liter
COD=780 mg/liter
N=60 mg/liter
P=10 mg/liter For the seepage water admitted at 31:
$Q_M$=60–100 m$^3$/day
AOX=1.7–3.2 mg/liter
COD=3,400–8,400 mg/liter
N=1,400–3,100 mg/liter For the thickened excess sludge sent to the digestion tower at 56:
$Q_M$=80–160 m$^3$/day
AOX=0.6–8.6 mg/liter
COD=1,500 mg/liter
N=60–120 mg/liter
P=20 mg/liter For the press water drawn off at 57:
$Q_M$=70–120 m$^3$/day
AOX=0.8 mg/liter
COD=750 mg/liter
N=1,000 mg/liter
P=20 mg/liter The primary storage basin 33 and secondary thickener 45 can have a volume of 550 m$^3$ each, and the holding capacity of the digestion tower is preferably approximately 3,600 m$^3$. The dewatered sludge that is drawn off at 51 can occur in an amount $Q_M$=35–70 m$^3$/day. The amount of excess sludge drawn off at 53 before thickening in 55 can amount to approximately 500–1,000 m$^3$/day.

Of the sludge that is drawn from the secondary sedimentation tank at 21, approximately 13,000–18,000 m$^3$/day can be sent back directly to the inlet of the activated sludge tank 2, and approximately 4,500 m$^3$/day can be returned via the sludge storage basin 23. Approximately 90–180 m$^3$/day of excess sludge and approximately 9,000–18,000 m$^3$/day of returned water can be sent via lines 25 and 27 back to the admission inlet 1 of aerobic treatment section A. The following numerical values are applicable for the purified water drawn from the purification plant at 19:

$Q_M$=18,300 m$^3$/day
AOX<0.04 mg/liter
COD<45 mg/liter
N<14 mg/liter
P<0.8 mg/liter The following biological degradation processes take place with regard to the primary impurity components of the waste water admissions. The COD (chemically oxidizable content) that is contained in the problematic waste water admitted at 31 is anaerobically biologically eliminated in the digestion tower 37, even if it is present in the highest concentrations (up to 0.5 kg per liter). In doing this, methane gas on the order of magnitude of 1 kWh per kg of COD is produced, which is drawn off via line 63 and sent for use.

In addition, AOX (absorbable organic halogen compounds) that is contained in the problematic waste water being admitted at 31 is anaerobically biologically eliminated in an economical way, whereby the concentration can be reduced from as much as 60 mg/liter down to 1.0 to 0.1 mg/liter. In order to eliminate 90% of the AOX, the biocoenosis of the digester 37 requires an adaptation time of 150 to 180 days. Following this period of time, the degradation runs with a holding time of 14 to 28 days in the digester.

Ammonium and organic nitrogen are not degraded in the digester 37, but remain in the digested sludge in their entirety. During the mechanical dewatering in device 49, a small part of it remains in the sludge and is separated out. The major portion of the nitrogen compounds is found in the filtrate drawn off via line 57 and in the press water. This is discharged into the biological low-capacity reactor 11 and there it is nitrified to about 70% and denitrified to about 30%. The complete nitrification/denitrification then takes place in the downstream activation stage 13. In this way, essentially complete degradation of the nitrogen compounds contained in the problematic waste water that is flowing in at 31 can be achieved.

The biological high-capacity reactor 9 is used for intercepting the COD contained in the communal waste water that is flowing in at 1 and to carry out a first, partial degradation (approximately 70%). In the high-capacity reactor 9, the AOX load that is contained in the communal waste water flowing in at 1 is incorporated about 50 to 70% into the existing excess sludge, and is sent along with that to the digester 37. Thus, in the anaerobic treatment section B the AOX load originating from the communal waste water flowing in at 1 is degraded more than 90%.

These processes lead to strongly increased production of methane gas in the digester 37, which can amount to 2.7 kWh per kg COD, which is four to five times the gas production rate that was common up to now.

Figure 2:
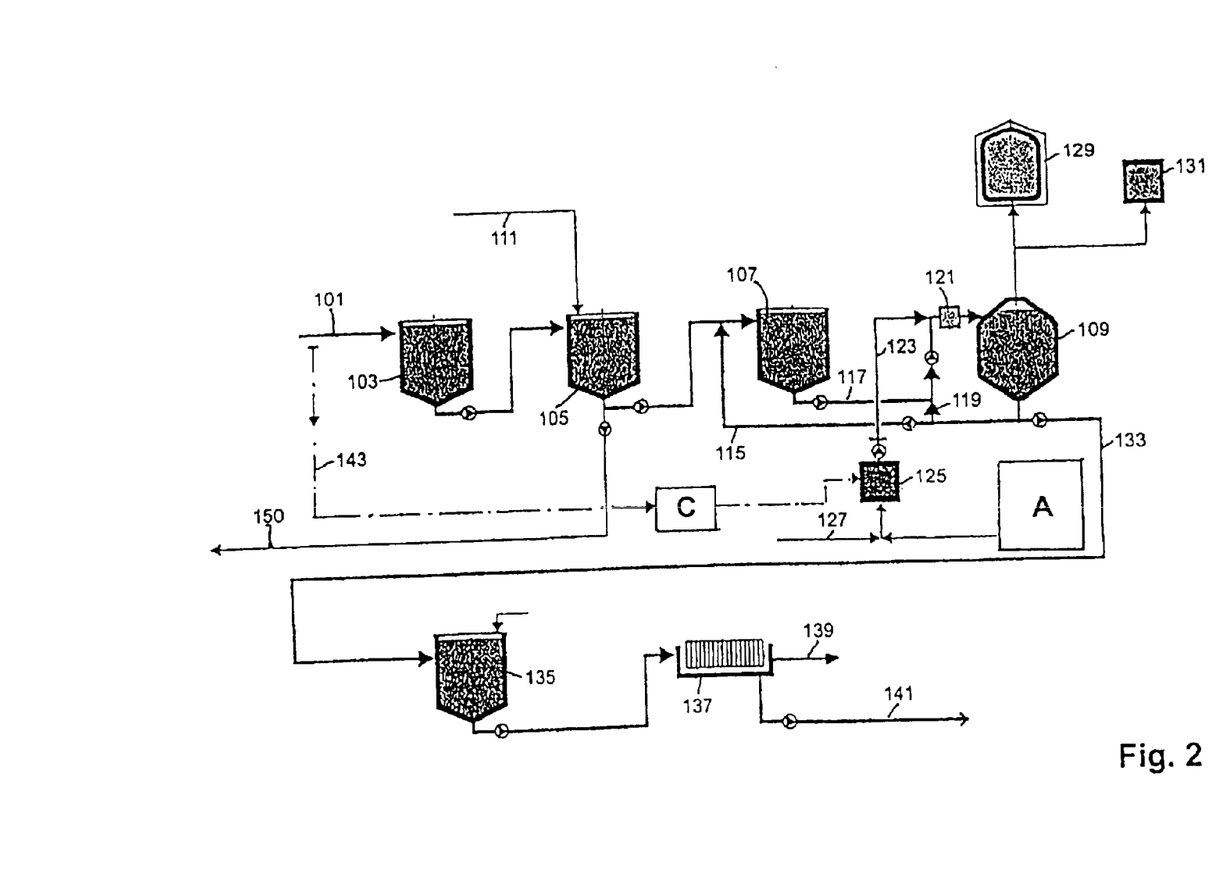
FIG. 2 Shows a diagrammatic view of the anaerobic treatment section of the waste water treatment plant in accordance with a second form of implementation.

Shown in FIG. 2 is a modified form of implementation of the anaerobic treatment section designated by B in FIG. 1.

Problematic waste water with high concentrations of dissolved impurities flows to an admission inlet 101. In particular, this can involve seepage water from a refuse dump, but highly concentrated waste water from industry and commerce that is supplied separately can also be mixed into it.

The waste water goes via an intermediate storage 103, a batch treatment tank 105 and a preparation tank 107 into a digester or digestion reactor 109. The intermediate storage basin 103 is used primarily for buffering of temporarily very high admission amounts in the admission inlet 101. In the batch treatment tank 105, chemicals such as caustic soda or milk of lime, for example, can be metered in via the line 111 in order to precipitate heavy metals such as chrome, for example, that are dissolved in the waste water. Excess sludge resulting from this can be drawn off via line 150 and sent to separate further treatment. In this way, a clean separation of the chrome-containing sludge is possible, which can then be sent for special disposal.

In the preparation tank 107, the waste water is mixed in a ratio of 1:0.2 to 1:1 with digested sludge that is taken from the digestion tower and sent via line 115. By means of a concentrated inoculation of this type, in the initial phase the adaptation time for the digestion tower 109 is kept very short. In trials at a purification plant with an inhabitant equivalence (EW) of approximately 125,000, it was observed that following an adaptation time of approximately 180 days, the degradation capacity with regard to AOX and COD increases substantially.

As a result of the constant supplying of biomass into the preparation tank 107, a stationary state is achieved that adjusts the existing growth of the biomass located in the digestion tower by means of biomass removal. The operation of tanks 105 and 107 preferably takes place in batches, whereby each filling and treatment batch preferably corresponds to one day's amount of water to be treated.

The mix of waste water and digested sludge that is prepared in tank 107 goes via line 117 into digester 109, whereby additional digested sludge can be mixed into this via line 119, and whereby preheating can take place in a heat exchanger 121.

Also sent to digester 109 via line 123 is aerobic excess sludge that comes from an aerobic treatment area, e.g., an activated sludge tank or an aerobic reactor, of a communal purification plant that is indicated globally and schematically in the drawing by block A. In principle, this communal purification plant can have any desired configuration, for example, the one shown in FIG. 1 for aerobic treatment section A.

The excess sludge from purification plant A is dewatered with a mechanical dewatering device 125 and thickened. The degree of dewatering or degree of thickening here is controlled in dependency on the amount of waste water flowing in at 101, as will be explained in more detail. The mechanical dewatering device 125 can be a belt filter, for example. Dewatering additives such as polymer, for example, can be mixed in via line 127.

The digestion gas (methane) resulting from digestion in the digestion tower 109 can be stored in a gas accumulator 129 and sent for a commercial use, e.g., for burning in a block-type thermal power station 131 for generating electric power and heat for heating purposes.

If it is not recirculated via lines 115 and 119, the digested sludge drawn from the digestion tower 109 is sent via line 133 and via a primary storage basin 135 to a mechanical dewatering operation, e.g., in a chamber filter press 137. The dewatered sludge can be removed at 139 and sent for disposal or use, e.g., in agriculture. The filtrate (press water) being discharged at 141, which still has impurities dissolved in it that were not degraded by the anaerobic treatment in the digestion tower 109, can be discharged into the communal purification plant identified by A and thus be sent for purification by means of aerobic treatment.

The mechanical dewatering device 125 can be controlled so that the degree of thickening, i.e., the content of dry substances ("TS" in German) of the thickened sludge can be adjusted to a desired value. Used for that purpose is a control device indicated schematically by C, which receives via signaling link 143 information regarding the amount of waste water (seepage water) being admitted at 101. Recording of the waste water amount by means of suitable measuring devices can take place in the admission inlet 101, or even earlier at the site where seepage water is occurring, i.e., at the refuse dump location.

As has been explained, the controllable thickening of the excess sludge in the dewatering device 125 has the primary purpose of avoiding unwanted dilution of the content of the digestion tower 109, i.e., to keep the solids concentration (dry substance) in the digestion tower 109 as consistently as possible at a desired operating value, and in any event, to keep the solids concentration from dropping below a minimum value for long periods of time. This is explained in more detail below with the aid of a numerical example which pertains to a typical application, but which should not be considered in any way restrictive.

Let us assume that seepage water from a refuse dump occurs in daily amounts that fluctuate, whereby typical values for the daily amount can be 100 m$^3$/day, 60 m$^3$/day or 120 m$^3$/day. Few undissolved solids are carried in the seepage water, on the order of magnitude of 1 g/liter. Operating experience has shown that the solids concentration in the digestion tower 109 should not be below 30 g/liter, and should preferably be in the range of 40 g/liter. Table 1 shows how the amount (line 4) and the solids content (line 5) of the excess sludge delivered by the mechanical dewatering device 125 is adjusted or controlled in order to achieve a largely constant daily amount of supplied solids in spite of fluctuating daily amounts of seepage water, and thus keep the solids content in the digestion tower 109 in the vicinity of the optimum value of approximately 40 g/liter.

As is shown in Table 1 for the three assumed cases 1, 2, 3 with seepage water daily amounts of 100 or 60 or 120 m$^3$/day, the amount of excess sludge added (line 4) is adjusted accordingly, so that the entire amount of sludge and seepage water sent to the digestion tower 109 remains a constant 180 m$^3$/day in all three cases (line 7). At the same time, the degree of thickening of the dewatering device 125, i.e., the solids content of the thickened sludge, is varied in such a way (line 5 of the table) that the total amount of solids in the added sludge (line 6) remains constant at approximately 7200 kg. Thus, a nearly constant solids content (line 9) in the range between 40 and 41 g/liter results for the mix of sludge and seepage water added to the digestion tower 109.

As can be seen from Table 1, the degree of thickening, i.e., the solids content of the thickened excess sludge (line 5) is typically in the range between 60 and 120 g/liter. This high solids content has additional benefits. For example, with increasing solids content, the danger that the phosphorous eliminated by the biological purification and contained in the sludge solids will dissolve in the water again (decrease of P redissolution) decreases. In addition, extended holding times in the digestion zone generally result from higher solids contents, or lower sludge amounts.

The invention's controlled mechanical thickening of the excess sludge in adaptation to the occurrence of seepage water thus has the following benefits, among others:

a) Controllable adjustment of the degree of thickening b) Longer holding times in the digester c) Improved AOX and COD degradation d) Decrease in P redissolution, and thus increased biological P elimination e) As a result of that, greater occurrence of methane gas, as well as better purification of the seepage water f) The use of precipitating agents can be reduced g) Lower sludge volumes as a result of higher solids contents h) As a result of that, lower disposal costs

TABLE 1

|  |  | Case 1 | Case 2 | Case 3 |
|---|---|---|---|---|
| ① Daily amount of seepage water | m³/d | 100 | 60 | 120 |
| ② Solids content in seepage water | g/l | 1 | 1 | 1 |
| ③ = ① × ② Amount of solids in seepage water | kg/d | 100 | 60 | 120 |
| ④ Daily amount of excess sludge | m³/d | 80 | 120 | 60 |
| ⑤ Solids content of the thickened sludge | g/l | 90 | 60 | 120 |
| ⑥ = ④ × ⑤ Amount of solids in sludge | kg/d | 7200 | 7200 | 7200 |
| ⑦ = ① + ④ Sum of sludge + seepage water | m³/d | 180 | 180 | 180 |
| ⑧ = ③ + ⑥ Sum of solids | kg/d | 7300 | 7260 | 7320 |
| ⑨ = ⑧ ÷ ⑦ Solids content | g/l | 40.6 | 40.3 | 40.7 |

Figure 3:
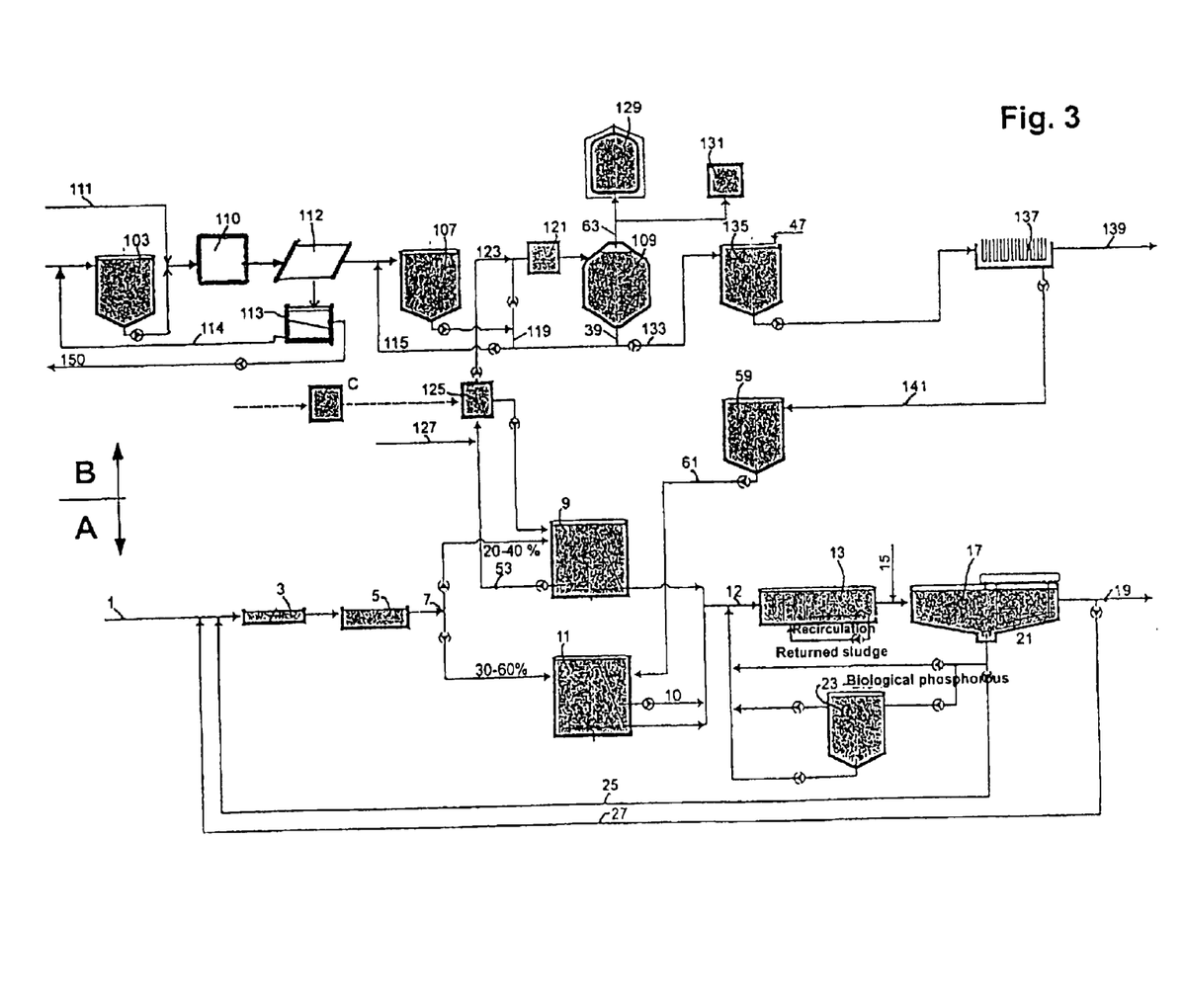
FIG. 3 Shows the diagrammatic view of a waste water treatment plant in accordance with a third form of implementation of the invention.

In the case of the waste water purification plant shown schematically in FIG. 3 as the third embodiment, the aerobic branch A shown in the lower part has the same design that was already shown in FIG. 1, so it is not necessary to repeat the description. The anaerobic branch B shown in the upper part of FIG. 3 has nearly the same design that was already shown in FIG. 2, so to that extent, reference can be made to the description given with regard to FIG. 2. The following components of anaerobic branch B of FIG. 3 are designed differently than in FIG. 2:

Located between the intermediate storage basin 103 and the preparation tank 107 instead of the batch treatment tank 105 shown in FIG. 2 is a continuous reactor 110 having a holding capacity of, for example, 40 m³, followed by lamellar separator 112. Taking place in the continuous reactor 110 by means of precipitating agents supplied via line 111 is a precipitation of the compounds contained in the waste water, in particular, those of heavy metals. The flakes formed by the precipitation are removed in the lamellar separator 112 and sent to a dewatering container 113 for further thickening. The sludge liquor separated in the dewatering container 113 can be sent via line 114 back to the inlet intermediate storage basin 103, while the thickened precipitation sludge can be drawn from the dewatering container 113 via line 150 and, for example, discharged as excess sludge into aerobic plant section A at a suitable location, and further treated there.

With the chemical precipitation either in the batch precipitation tank 105 per FIG. 2 or in the continuous precipitation reactor 110 of FIG. 3, primarily heavy metals are removed from the waste water by means of chemical precipitation, so that the present very low limit values for heavy metals in the discharge from the purification plant can be met. According to recent administrative regulations, these limit values are 0.05 mg/liter for mercury, 0.1 mg/liter for cadmium, 0.5 mg/liter each for chrome, nickel, lead and copper, and 2.0 mg/liter for zinc.

Moreover, the purification plant per FIG. 3 is also designed in its aerobic section A for the most effective biological nitrogen elimination and phosphorous elimination possible, both of which take place in the activated sludge tank 13. In addition, the holding time of a portion of the returned sludge in the sludge storage basin 23 contributes to the biological elimination of phosphorous.

Figure 4:
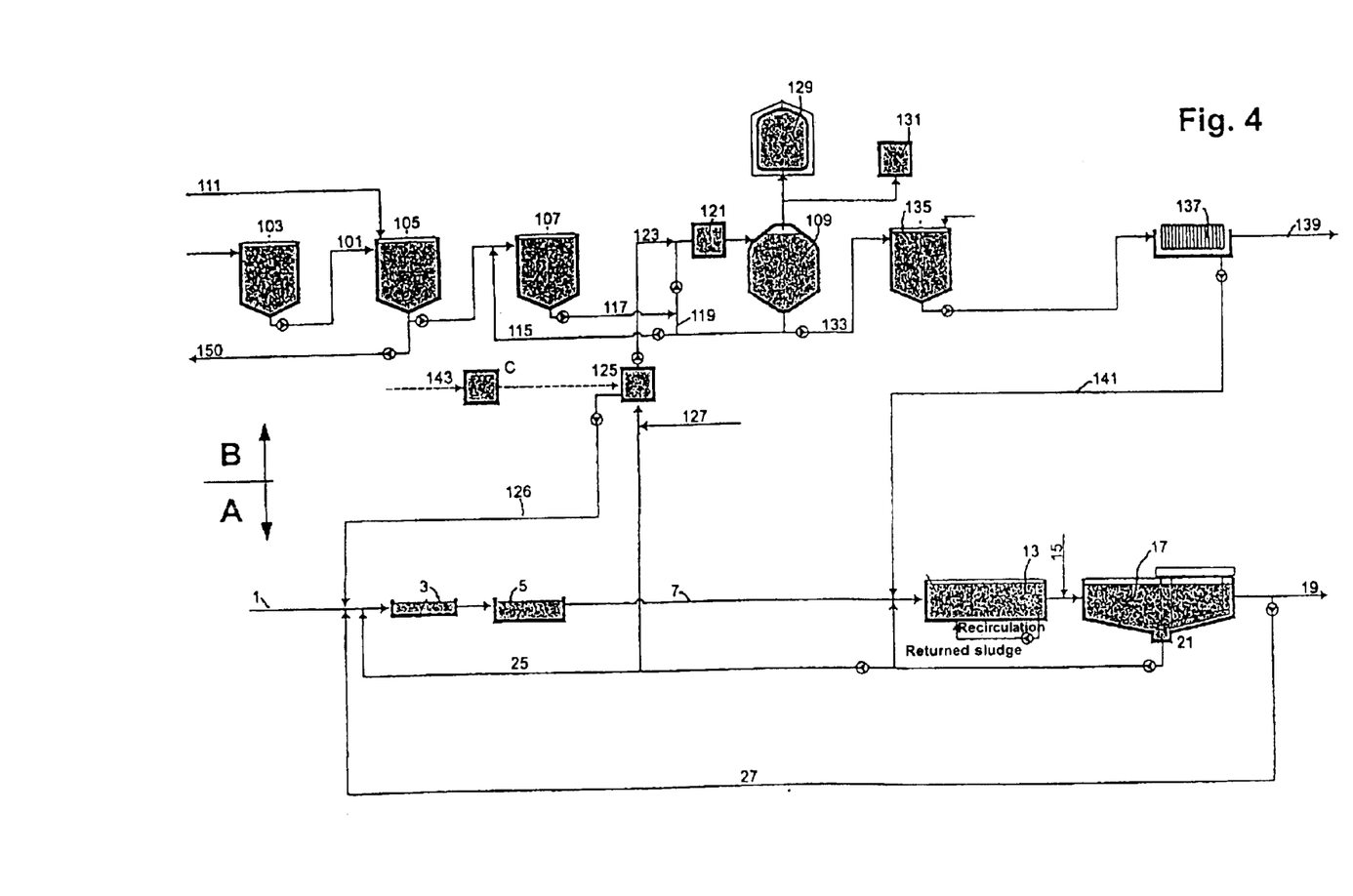
FIG. 4 Shows the diagrammatic view of a further modified fourth form of implementation.

In the plant schematic shown in FIG. 4, the anaerobic treatment section B in the upper part has the same arrangement as has already been shown and described with the aid of FIG. 2. For the aerobic treatment section A shown in the lower part of FIG. 4, a simplified design is shown that differs from FIGS. 1 and 3. The aerobic high-capacity and low-capacity reactors 9 and 11 shown in FIG. 1 are omitted in FIG. 4. The communal waste water supplied at 1 is sent via line 7 from the sand catcher 5 or a primary sedimentation tank (not shown) directly into the activated sludge tank 13, in which the entire aerobic purification, including biological denitrification and phosphorous elimination, takes place.

Further differences in the form of implementation between FIG. 4 and FIG. 1 consist in the fact that the press water that occurs during the digested sludge dewatering is sent via line 141 to the inlet of the activated sludge tank 13. In addition, the filtrate that occurs in the dewatering device 125 during the dewatering of the excess sludge that is to be sent back to the digester 109 is sent via line 126 to the waste water admission inlet 1.

With the plant per FIG. 4, a biological purification capacity for nitrogen and phosphorus that is lower in comparison with the plants per FIG. 1 and FIG. 3 has to be accepted.

The invention is not limited to the details of the forms of implementation shown. Instead, the arrangements shown in the drawings, and specifically, independently of each other in each case, the aerobic treatment section A and/or the anaerobic treatment section B, can be modified in multiple ways without deviating from the object of invention defined in the claims.

What is claimed is:

1. Method for treating waste water, comprising:
   providing first and second inlet streams of waste water of different origins, the waste water of said second inlet stream having a concentration of dissolved impurities substantially higher than that of the waste water of said first inlet stream;
   in an anaerobic treatment zone subjecting the waste water of said second inlet stream to an anaerobic degradation of the dissolved contents to form digested sludge and digested gas; in an aerobic treatment zone subjecting the waste water of said first inlet stream to an aerobic treatment to form an additional sludge;
   sending the additional sludge to the anaerobic treatment zone;
   mechanically dewatering the additional sludge before sending it into the anaerobic treatment zone; and
   controlling the degree of dewatering in such a way that the concentration of dry substance in the anaerobic treatment zone does not fall below a predetermined minimum value for long periods of time.

2. Method according to claim 1, further comprising controlling the degree of dewatering as a function of the amount of waste water sent to the anaerobic treatment zone.

3. Method according to claim 2, further comprising dewatering digested sludge taken from the anaerobic treatment zone to produce a filtrate and sending said filtrate to an aerobic treatment zone of the waste water purification plant.

4. Method according to claim 3, further comprising subjecting said filtrate to nitrogen degradation in the aerobic treatment zone of the waste water purification plant.

5. Method according to claim 1, further comprising dewatering digested sludge taken from the anaerobic treatment zone to produce a filtrate and sending said filtrate to an aerobic treatment zone of the waste water purification plant.

6. Method according to claim 5, further comprising subjecting said filtrate to nitrogen degradation in the aerobic treatment zone of the waste water purification plant.

7. Waste water purification plant for treating waste water comprising:
- a first admission inlet and a second admission inlet, through which waste water of different origins enters, the waste water at said second admission inlet having a concentration of dissolved impurities substantially higher than the waste water at said first admission inlet;
- at least one aerobic treatment zone in communication with said first admission inlet for receiving waste water therefrom for aerobic treatment to form sludge;
- at least one anaerobic treatment zone in communication with said second admission inlet for receiving waste water therefrom for anaerobic treatment to form digested sludge;
- means far removing sludge from the at least one aerobic treatment zone;
- a mechanical dewatering device for dewatering the sludge;
- means for sending the dewatered sludge into the anaerobic treatment zone; and
- means for controlling the degree of dewatering of the mechanical dewatering device.

8. Purification plant according to claim 7, in which the at least one aerobic treatment zone includes a high-capacity zone and a low-capacity zone, said low-capacity zone being operated with less sludge loading than said high-capacity zone, and wherein the sludge sent via the mechanical dewatering device of the anaerobic zone is taken from the high-capacity zone.

9. Purification plant in accordance with claim 8, and further comprising a precipitation zone for the chemical precipitation of waste water contents, said precipitation zone disposed between the second admission inlet and the anaerobic treatment zone.

10. Purification plant according to claim 8, further comprising:
- means for withdrawing digested sludge from the anaerobic treatment zone;
- a device for the mechanical dewatering of the digested sludge to form filtrate; and
- means for sending the filtrate to at least one aerobic zone that is charged with the waste water from the first admission inlet.

11. Purification plant in accordance with claim 10, and further comprising a precipitation zone for the chemical precipitation of waste water contents, said precipitation zone disposed between the second admission inlet and the anaerobic treatment zone.

12. Purification plant according to claim 7, further comprising:
- means for withdrawing digested sludge from the anaerobic treatment zone;
- a device for the mechanical dewatering of the digested sludge to form filtrate; and
- means for sending the filtrate to at least one aerobic zone that is charged with the waste water from the first admission inlet.

13. Purification plant in accordance with claim 12, and further comprising a precipitation zone for the chemical precipitation of waste water contents, said precipitation zone disposed between the second admission inlet and the anaerobic treatment zone.

14. Purification plant in accordance with claim 7, and further comprising a precipitation zone for the chemical precipitation of waste water contents, said precipitation zone disposed between the second admission inlet and the anaerobic treatment zone.

* * * * *